US006933842B2

(12) United States Patent
Oesterling et al.

(10) Patent No.: US 6,933,842 B2
(45) Date of Patent: Aug. 23, 2005

(54) METHOD AND SYSTEM FOR REMOTELY MONITORING VEHICLE DIAGNOSTIC TROUBLE CODES

(75) Inventors: Christopher L. Oesterling, Troy, MI (US); Jeffrey M. Stefan, Clawson, MI (US)

(73) Assignee: General Motors Corporation, Detroit, MI (US)

( * ) Notice: Subject to any disclaimer, the term of this patent is extended or adjusted under 35 U.S.C. 154(b) by 148 days.

(21) Appl. No.: 10/675,343

(22) Filed: Sep. 30, 2003

(65) Prior Publication Data

US 2005/0068174 A1 Mar. 31, 2005

(51) Int. Cl.[7] .............................. G08B 1/08; H04Q 7/00
(52) U.S. Cl. ..................... 340/539.24; 340/438; 701/29
(58) Field of Search ........................ 340/539.24, 539.1, 340/438, 439; 701/29, 33, 35, 36

(56) References Cited

U.S. PATENT DOCUMENTS 6,006,146 A * 12/1999 Usui et al. ..................... 701/29
6,025,776 A * 2/2000 Matsuura ..................... 340/438
6,677,854 B2 * 1/2004 Dix ............................. 340/438
6,807,469 B2 * 10/2004 Funkhouser et al. .......... 701/33
6,819,236 B2 * 11/2004 Kawai et al. .......... 340/539.24

* cited by examiner

*Primary Examiner*—John Tweel, Jr.
(74) *Attorney, Agent, or Firm*—Anthony Luke Simon

(57) ABSTRACT

The invention provides a method and system for remotely monitoring vehicle diagnostic trouble codes. A list including identifiers for one or more vehicle electronic modules and one or more diagnostic trouble codes is sent via a wireless network to a vehicle telematics unit. The telematics unit periodically sends a request to each electronic module on the list asking that module to report any diagnostic trouble codes associated with the module. If the telematics unit receives a diagnostic trouble code from the module in response to this request, the received diagnostic trouble code is compared with each diagnostic trouble code on the list. If the received diagnostic trouble code corresponds with a diagnostic trouble code on the list, a message is transmitted from the telematics unit to a call center. The call center determines the appropriate action to take in response to the diagnostic trouble code or codes detected.

20 Claims, 2 Drawing Sheets

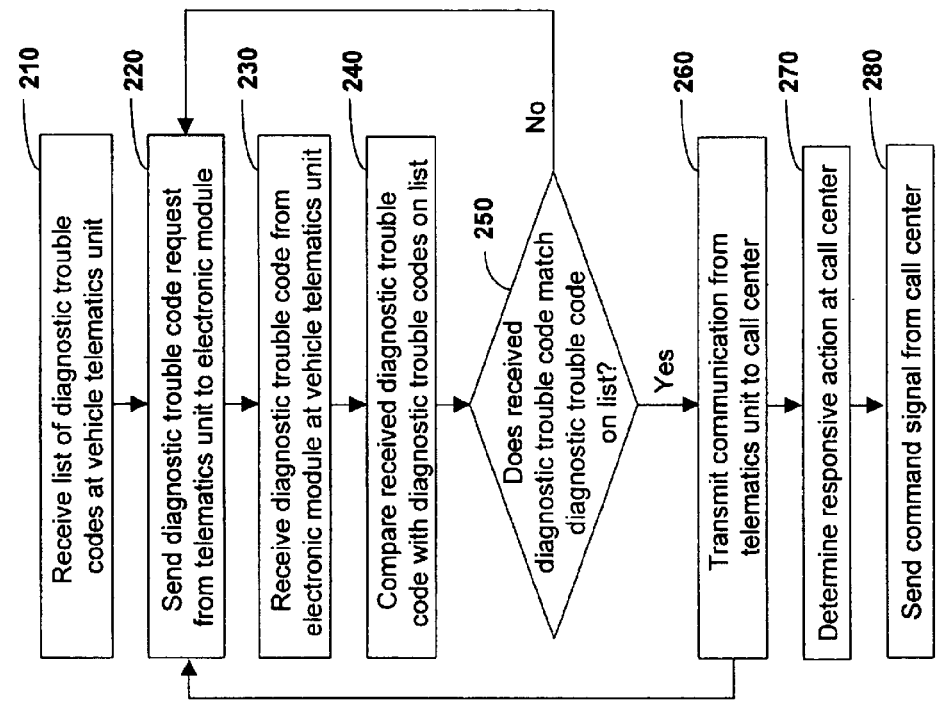

METHOD AND SYSTEM FOR REMOTELY MONITORING VEHICLE DIAGNOSTIC TROUBLE CODES

FIELD OF THE INVENTION

This invention relates generally to data transmission over a wireless communication system. More specifically, the invention relates to a method and system for remotely monitoring vehicle diagnostic trouble codes.

BACKGROUND OF THE INVENTION

Modern automobiles often include self-diagnostic capabilities to detect problems that affect engine performance, emissions, braking, and other onboard systems that are computer controlled. When the electronic module associated with a system, circuit, or component detects a reading outside a predefined range, an alphanumeric diagnostic trouble code that identifies the fault is generated and saved to the onboard computer. If certain diagnostic trouble codes are received by the computer, the computer will illuminate a warning light within the vehicle, such as a "Check Engine" light.

On some vehicles, the onboard computer can be put into a diagnostic mode by grounding certain terminals on a diagnostic connector. This causes the "Check Engine" or other lights to display the fault code. On many vehicles, however, a scan tool must be plugged into the computer system by a service technician to access and read the codes. In either case, the codes may be drawn off using only a direct, physical connection to the vehicle. The codes are then used in conjunction with the vehicle's service manual to determine which systems, circuits, or components should be tested to fully diagnose the fault.

Wireless communication services for mobile vehicles, such as navigation and roadside assistance, have been available for some time. Currently information pertaining to a vehicle's location and vehicle information can be collected and stored using such systems. This data is occasionally uploaded to a central data repository such as a call center for analysis.

A method is needed that combines the self-diagnostic capabilities of modern vehicles with the convenience of wireless communications data collection to allow a vehicle to be monitored on a regular basis instead of being checked only during periodic maintenance visits or when a problem is detected by the vehicle's driver. Such a method would offer convenience and potential cost savings to the driver of the vehicle. It would also offer the vehicle manufacturer benefits such as reduced warranty costs and improved data collection that can aid in preventing recalls. Therefore, it would be desirable to provide a method and system for remotely monitoring vehicle diagnostic trouble codes that offers the above benefits and overcomes the aforementioned and other disadvantages.

SUMMARY OF THE INVENTION

One aspect of the invention provides a method for remotely monitoring vehicle diagnostic trouble codes. A vehicle telematics unit receives a list including at least one diagnostic trouble code. The telematics unit receives at least one diagnostic trouble code from at least one vehicle electronic module. A determination is made as to whether the diagnostic trouble code received from the vehicle electronic module corresponds with a diagnostic trouble code on the list. If a positive determination is made, a communication is transmitted from the telematics unit to a call center.

Another aspect of the invention provides a computer-usable medium including a program for remotely monitoring vehicle diagnostic trouble codes. The program includes computer program code for receiving a list including at least one diagnostic trouble code at a vehicle telematics unit, receiving at least one diagnostic trouble code from at least one vehicle electronic module at the vehicle telematics unit, determining if the received diagnostic trouble code corresponds with the diagnostic trouble code on the list, and transmitting a communication from the telematics unit to a call center based on a positive determination.

Yet another aspect of the invention provides a system for remotely monitoring vehicle diagnostic trouble codes. The system includes means for receiving a list including at least one diagnostic trouble code at a vehicle telematics unit, receiving at least one diagnostic trouble code from at least one vehicle electronic module at the vehicle telematics unit, determining if the received diagnostic trouble code corresponds with the diagnostic trouble code on the list, and transmitting a communication from the telematics unit to a call center based on a positive determination.

The aforementioned, and other features and advantages of the invention, will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE FIGURES

FIG. 2 is a flow diagram of one embodiment of a method for remotely monitoring vehicle diagnostic trouble codes using the system of FIG. 1 in accordance with the present invention.

DETAILED DESCRIPTION OF THE PRESENTLY PREFERRED EMBODIMENTS

Figure 1:
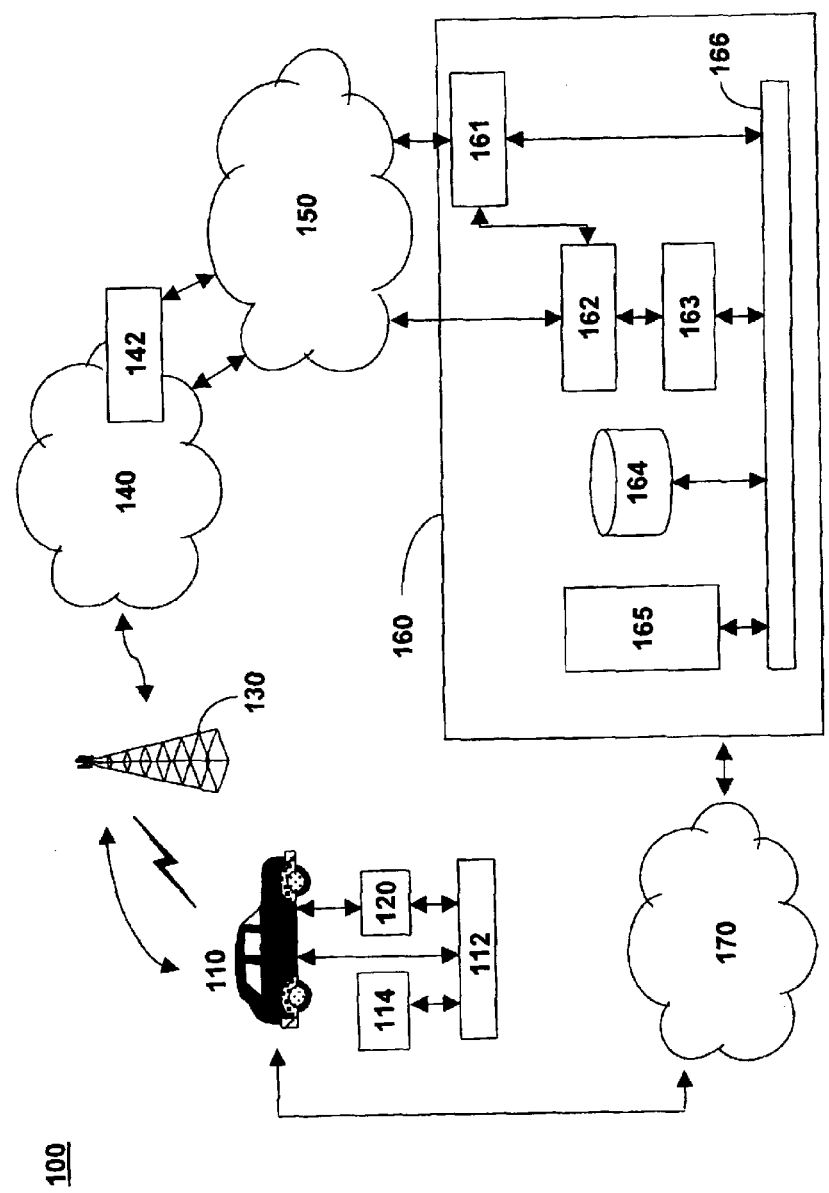
FIG. 1 is an illustration of one embodiment of a system for remotely monitoring vehicle diagnostic trouble codes, in accordance with the present invention.

FIG. 1 shows an illustration of one embodiment of a system for remotely monitoring vehicle diagnostic trouble codes, in accordance with the present invention at 100.

Diagnostic trouble code monitoring system 100 includes a mobile vehicle 110, an in-vehicle telematics unit 120, one or more wireless carrier systems 130, one or more communication networks 140, one or more short message service centers 142, one or more land networks 150, one or more call centers 160, and one or more vehicle service centers 170.

Mobile vehicle 110 includes a vehicle communication bus 112 connected to one or more vehicle electronic modules 114. Vehicle communication bus 112 is also connected to telematics unit 120. Thus, diagnostic trouble codes can be transmitted from electronic modules 114 to telematics unit 120 via vehicle communication bus 112. Electronic modules of interest include those associated with, for example, powertrain control or an antilock brakes system.

Telematics unit 120 includes, for example, a digital signal processor (DSP) connected to a wireless modem, a global positioning system (GPS) unit, an in-vehicle memory, a microphone, one or more speakers, and a wireless communication device such as an analog, digital, dual-mode, dual-band, multi-mode or multi-band cellular phone. The digital signal processor generates and accepts digital signals, such as those representing diagnostic trouble codes, that are transmitted between telematics unit 120 and vehicle communication bus 112 or between telematics unit 120 and call center 160. In certain embodiments, the DSP is a functional block of a microcomputer, microcontroller or ASIC.

Telematics unit 120 includes suitable software for receiving and transmitting data communications and for performing other routines and requested services. In the present embodiment, telematics unit 120 receives communications from and transmits communications to call center 160 through wireless carrier system 130, communication network 140, and land network 150. In an alternative embodiment, one or more of the intermediate connections between telematics unit 120 and call center 160 may be eliminated.

Wireless carrier system 130 may be any suitable system for transmitting a signal from mobile vehicle 110 to communication network 140 and may include one or more short message service centers 142 that prescribe alphanumeric short messages to and from mobile vehicles 110. Typically, short message service center 142 stores and buffers the messages and includes message entry features, administrative controls, and message transmission capabilities. Short message services may include other telematic services such as broadcast services, time-driven message delivery, autonomous message delivery, and database-driven information services.

Communication network 140 may be any suitable system or collection of systems for connecting wireless carrier system 130 to mobile vehicle 110 and to land network 150. In the present embodiment, communication network 140 comprises services from more than one mobile telephone switching office and wireless network. In an alternative embodiment, communication network 140 may comprise services from a single mobile telephone switching office or wireless network.

Land network 150 is a public-switched telephone network (PSTN) and may comprise a wired network, an optical network, a fiber network, another wireless network, or any combination thereof. Land network 150 is connected to one or more landline telephones and connects communication network 140 to call center 160. In an alternative embodiment, land network 150 may connect a first wireless carrier system 130 with a second wireless carrier system 130. Land network 150 may comprise an Internet protocol (IP) network.

Call center 160 is a location where many calls may be received and serviced at the same time, or from which many calls may be sent at the same time. In the present embodiment, the call center contains the functions of both a telematics call center, prescribing communications to and from mobile vehicle 110, and a voice call center, providing verbal communications between an advisor in the call center and a subscriber in a mobile vehicle. In an alternative embodiment, the call center may contain only the function of a telematics call center. Call center 160 typically includes one or more voice and data switches 161, one or more data transmission devices 162, one or more communication services managers 163, one or more communication services databases 164, one or more advisors 165, and one or more networks 166.

One or more switches 161 are connected to land network 150 and may receive a modem signal from an analog or digital modem. Switch 161 is capable of transmitting either voice or data transmissions from a communication node and may also receive voice or data transmissions from mobile vehicle 110 through wireless carrier system 130, communications network 140, and land network 150. Switch 161 may receive from or send data transmissions to data transmission device 162 and may receive from or send voice transmissions to advisor 165 via bus system 166.

Data transmission device 162 is capable of sending data to or receiving data from switch 161 and is, for example, an IP router or a modem. Data transmission device 162 may transfer data to or from one or more advisors 165, one or more communication services managers 163, one or more communication services databases 164, and any other device connected to bus system 166. Data transmission device 162 conveys information received from communication network 140 to one or more communication services manager 163.

Communication services manager 163 is connected to switch 161, data transmission device 162, and advisor 165 through bus system 166. The call center may contain any combination of hardware or software facilitating data transmissions between call center 160 and mobile vehicle 110 and between call center 160 and vehicle repair centers 170.

Communication services manager 163 receives information from mobile vehicle 110 through one or more of wireless carrier system 130, communication network 140, land network 150, and data transmission device 162. Communication services manager 163 sends information to mobile vehicle 110 through one or more of data transmission device 162, land network 140, communication network 130, and wireless carrier system 120. Communication services manager 163 provides information to mobile vehicle 110 from communication services database 164. Information provided includes a list of diagnostic trouble codes of interest for monitoring.

Communication services database 164 contains records on one or more mobile vehicles 110. Records in communication services database 164 may include vehicle identification, location information, status information, recent action information regarding mobile vehicle 110, and diagnostic trouble codes received from mobile vehicle 110. Communication services database 164 may provide information and other support to communication services manager 163.

In the present embodiment, advisor 165 includes both a real advisor, such as a human being in verbal communication with telematics unit 120, and a virtual advisor, such as a synthesized voice interface responding to requests from telematics unit 120. In an alternative embodiment, advisor 165 may be just one type of advisor. Advisor 165 communicates with telematics unit 120 in mobile vehicle 110 through wireless carrier system 130, communication network 140, and land network 150 using voice transmissions, or through communication services manager 163 and switch 161 using data transmissions.

Advisor 165 provides services to telematics unit 120 of vehicle 110. Advisor 165 may communicate with communication services manager 163 or any other device connected to bus system 166. Services provided by communication services advisor 165 may include enrollment services, navigation assistance, real-time traffic advisories, directory assistance, roadside assistance, business or residential assistance, information services assistance, emergency assistance, and communications assistance.

In the present embodiment, services provided by advisor 165 include determining the appropriate action to take based on the diagnostic trouble codes received from mobile vehicle 110 and taking such action. One such action is for advisor 165 to deliver to the driver of mobile vehicle 110 information regarding actions to be taken in response to the diagnostic trouble codes relayed to call center 160 by telematics unit 120. Call center 160 is additionally connected to one or more vehicle service centers 170, and rather than contacting the driver of vehicle 110, call center 160 may report information regarding the diagnostic trouble codes to vehicle service center 170, which may then communicate with the driver of vehicle 110. Vehicle service center 170 may be, for example, a vehicle repair center or a warranty center.

Another aspect of the present invention is a method for remotely monitoring vehicle diagnostic trouble codes. FIG. 2 shows a flow diagram of one embodiment at 200, in accordance with the present invention, using an example system as in FIG. 1.

A list including one or more diagnostic trouble codes of interest for monitoring is received at a vehicle telematics unit (Block 210). In the present embodiment, the list also specifies one or more electronic modules to be queried regarding these codes. The electronic modules are associated with systems, circuits, or components within the vehicle. In another embodiment, where, for example, diagnostic trouble codes can be queried without the need to reference a specific electronic module, the list may include only diagnostic trouble codes. Typically, the list will include more than one diagnostic trouble code for more than one electronic module. Electronic modules to be queried may be, for example, those associated with a vehicle's powertrain control and antilock brakes system.

In the present embodiment, the list to be received at the vehicle telematics unit is accessed by a call center, then the vehicle is contacted via a wireless network and the list is sent from the call center to the vehicle via the wireless network. In alternative embodiments, the list may be transmitted to the vehicle by other means, such as by the factory during manufacture or by a repair center during servicing, via either a wireless network or a hardwired connection.

The vehicle telematics unit periodically sends a request to each electronic module of interest via a vehicle communication bus to report any diagnostic trouble codes associated with the module (Block 220). In the present embodiment, the diagnostic trouble code request is initiated responsive to a trigger event that is specified in the list received at the vehicle telematics unit. For example, the triggering event may be a specified number of ignitions or a specified time each day. The telematics unit and the electronic modules are connected to the same vehicle communication bus, allowing both the telematics unit request and the electronic module response to be received via the communication bus. In one embodiment, the interval between requests is configurable. In one example, the interval is adjusted from a request every sixty minutes, to a request every ten minutes. The interval, in one example, is configured by the call center. In another embodiment, the interval is configured by a user.

If all systems, circuits, and components to be queried within the vehicle are operating satisfactorily, no diagnostic trouble codes will be returned in response to the request. However, if a system, for example, is experiencing a problem, the telematics unit will receive one or more diagnostic trouble codes from the electronic module associated with that system (Block 230).

Each diagnostic trouble code received from an electronic module is compared with each code on the list (Block 240), and a determination is made as to whether any received code corresponds with, meaning matches identically, a code on the list (Block 250). Typically, this is accomplished within the vehicle using appropriate software installed in a digital signal processor that is a component of the telematics unit.

If a positive determination is made, a communication is transmitted from the telematics unit to a call center (Block 260). Typically a call center is a telematics service provider; however, a call center for purposes of the present invention may be any location where many calls may be received and serviced at the same time, or from which many calls may be sent at the same time.

The communication transmitted from the telematics unit to the call center may be, for example, a simple notification that a matching diagnostic trouble code has been identified. The call center may then contact the vehicle and initiate a diagnostic trouble code request, specifying that the received codes are to be transmitted to a call center database. Alternatively, the initial communication transmitted from the telematics unit to the call center may include data representing the codes identified, which have been saved to the in-vehicle memory associated with the telematics unit. The data representing the codes may remain cached for a specified period of time to permit comparison of previous data with more recent data.

Responsive action is determined at the call center based on the transmitted diagnostic trouble code or codes (Block 270). In the present embodiment, the responsive action may be determined by one or both of a human being or a computer algorithm. In one example, a computer algorithm may determine the appropriate responsive action for a previously encountered configuration of diagnostic trouble codes. In another example, for a unique configuration of diagnostic trouble codes or for a configuration indicating a serious problem, the computer algorithm may process the information and deliver results to a human being who will be responsible for determining the appropriate responsive action.

Once the appropriate responsive action has been determined, a command signal is sent from the call center (Block 280). For example, where the diagnostic trouble code configuration indicates a serious problem, a human advisor may initiate a call through the vehicle telematics unit to notify the driver that the vehicle should be taken to a vehicle service center within a specified period of time. Where the problem is less serious, the computer algorithm may prompt a communication to be sent to a vehicle service center in a location convenient to the driver of the vehicle. The vehicle service center can then send a postcard or other communication to the driver asking that the vehicle be brought in for service. Where the diagnostic trouble code configuration indicates an emerging but not yet active problem, the appropriate responsive action may be simply to store the information in a communication services database that contains other identifiers and records for the vehicle. Diagnostic trouble codes received at a later date may then prompt notification of the vehicle's driver that service is required.

The list of diagnostic trouble codes may be modified at the vehicle telematics unit as needed. For example, where the diagnostic trouble code configuration indicates an emerging but not yet active problem, additional codes may be added to the list to provide more information regarding the problem, or the frequency of monitoring may be increased by sending a list including an additional or different triggering event.

In practice, the described method provides a portal into the vehicle that allows the functioning of systems, circuits, and components within the vehicle to be monitored remotely. Information obtained through the described method may identify a malfunction within the vehicle before a minor problem becomes a serious problem, preventing the vehicle's driver from being stranded by a stalled or otherwise nonfunctioning vehicle. Problems can be identified and eliminated before the driver even notices impaired performance of the vehicle. Information obtained may also be used to quickly identify a problem present in a line of vehicles, allowing the problem to be corrected in vehicles during manufacture, thus preventing recalls. Information gathered may also be used to improve the design of future vehicles. All of these benefits result in both increased satisfaction for the customer and reduced costs for the manufacturer.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

What is claimed is:

1. A method for remotely monitoring vehicle diagnostic trouble codes, comprising:

receiving a list including at least one diagnostic trouble code at a vehicle telematics unit;

receiving at least one diagnostic trouble code from at least one vehicle electronic module at the vehicle telematics unit;

determining if the received diagnostic trouble code corresponds with the diagnostic trouble code on the list; and transmitting a communication from the telematics unit to a call center based on a positive determination.

2. The method of claim 1 wherein the list received at the vehicle telematics unit is sent from a call center via a wireless network.

3. The method of claim 1 wherein receiving at least one diagnostic trouble code from at least one vehicle electronic module comprises periodically sending a diagnostic trouble code request from the telematics unit to the electronic module via a vehicle communication bus and receiving at least one diagnostic trouble code from the electronic module to the telematics unit via the vehicle communication bus in response to the request.

4. The method of claim 3 wherein the diagnostic trouble code request is initiated responsive to a trigger event.

5. The method of claim 4 wherein the list received at the vehicle includes the trigger event.

6. The method of claim 1 wherein the list received at the vehicle includes at least one vehicle electronic module that is to receive a diagnostic trouble code request from the telematics unit.

7. The method of claim 1 further comprising:

determining responsive action at the call center based on the transmitted diagnostic trouble code.

8. The method of claim 7 further comprising:

sending a command signal from the call center based on the responsive action determination.

9. The method of claim 1 further comprising:

modifying the list at the vehicle telematics unit.

10. A computer usable medium including a program for remotely monitoring vehicle diagnostic trouble codes, comprising:

computer program code for receiving a list including at least one diagnostic trouble code at a vehicle telematics unit;

computer program code for receiving at least one diagnostic trouble code from at least one vehicle electronic module at the vehicle telematics unit;

computer program code for determining if the received diagnostic trouble code corresponds with the diagnostic trouble code on the list; and computer program code for transmitting a communication from the telematics unit to a call center based on a positive determination.

11. The computer usable medium of claim 10 further comprising:

computer program code for sending the list received at the vehicle telematics unit from a call center via a wireless network.

12. The computer usable medium of claim 10 further comprising:

computer program code for periodically sending a diagnostic trouble code request from the telematics unit to the electronic module via a vehicle communication bus.

13. The computer usable medium of claim 10 further comprising:

computer program code for determining responsive action at the call center based on the transmitted diagnostic trouble code.

14. The computer usable medium of claim 10 further comprising:

computer program code for sending a command signal from the call center based on the responsive action determination.

15. The computer usable medium of claim 10 further comprising:

computer program code for modifying the list at the vehicle telematics unit.

16. A system for remotely monitoring vehicle diagnostic trouble codes, comprising:

means for receiving a list including at least one diagnostic trouble code at a vehicle telematics unit;

means for receiving at least one diagnostic trouble code from at least one vehicle electronic module at the vehicle telematics unit;

means for determining if the received diagnostic trouble code corresponds with the diagnostic trouble code on the list; and means for transmitting a communication from the telematics unit to a call center based on a positive determination.

17. The system of claim 16 further comprising:

means for sending the list from a call center.

18. The system of claim 16 further comprising:

means for determining responsive action at the call center based on the transmitted diagnostic trouble code.

19. The system of claim 16 further comprising:

means for sending a command signal from the call center based on the responsive action determination.

20. The system of claim 16 further comprising:

means for modifying the list at the vehicle telematics unit.

* * * * *